(12) United States Patent
Rissmeyer (10) Patent No.: US 7,509,436 B1
(45) Date of Patent: Mar. 24, 2009

(54) SYSTEM AND METHOD FOR INCREASED VIRTUAL DRIVER THROUGHPUT

(75) Inventor: Charles Steven Rissmeyer, Coon Rapids, MN (US)

(73) Assignee: Cisco Technology, Inc., San Jose, CA (US)

( * ) Notice: Subject to any disclaimer, the term of this patent is extended or adjusted under 35 U.S.C. 154(b) by 795 days.

(21) Appl. No.: 10/143,503

(22) Filed: May 9, 2002

(51) Int. Cl.
*G06F 15/16* (2006.01)
*G06F 9/00* (2006.01)

(52) U.S. Cl. .............. 709/249; 709/250; 709/321; 709/326; 709/251; 709/253; 710/10; 710/11; 710/105

(58) Field of Classification Search ............. 709/230, 709/238, 250, 217, 249, 236; 711/163; 710/2, 710/3–5, 33, 48; 713/1; 370/230, 351; 703/23; 345/520
See application file for complete search history.

(56) References Cited

U.S. PATENT DOCUMENTS

| | | | |
|---|---|---|---|
| 5,390,326 A | 2/1995 | Shah | |
| 5,812,821 A * | 9/1998 | Sugi et al. | 703/25 |
| 5,996,024 A | 11/1999 | Blumenau | |
| 5,996,027 A | 11/1999 | Volk et al. | |
| 6,018,765 A * | 1/2000 | Durana et al. | 709/217 |
| 6,041,381 A | 3/2000 | Hoese | |
| 6,108,699 A | 8/2000 | Moiin | |
| 6,131,119 A | 10/2000 | Fukui | |
| 6,134,673 A | 10/2000 | Chrabaszcz | |
| 6,145,019 A | 11/2000 | Firooz et al. | |
| 6,163,855 A | 12/2000 | Shrivastava et al. | |
| 6,185,620 B1 * | 2/2001 | Weber et al. | 709/230 |
| 6,195,760 B1 | 2/2001 | Chung et al. | |
| 6,209,023 B1 | 3/2001 | Dimitroff et al. | |
| 6,219,771 B1 | 4/2001 | Kikuchi et al. | |
| 6,269,396 B1 | 7/2001 | Shah et al. | |
| 6,314,526 B1 | 11/2001 | Arendt et al. | |
| 6,327,622 B1 | 12/2001 | Jindal et al. | |
| 6,343,320 B1 | 1/2002 | Fairchild et al. | |
| 6,353,612 B1 * | 3/2002 | Zhu et al. | 370/360 |

(Continued)

OTHER PUBLICATIONS

*VMware ESX Server: User's Manual*, Version 1.0, obtained from http://web.archive.org/web/20010060820103/www.vmware.com/support,(Jun. 6, 2001),122-124.

(Continued)

*Primary Examiner*—Jude J Jean Gilles
(74) *Attorney, Agent, or Firm*—Schwegman, Lundberg & Woessner, P.A.

(57) ABSTRACT

A computerized system and method for provide increased data throughput for a virtual driver. The system includes a SCSI (Small Computer System Interconnect) port manager; a miniport driver operatively coupled to the SCSI port manager; and a network interface operatively coupled to the miniport driver. Upon receiving indication that a SCSI command has been completed, the miniport driver issues a request to the SCSI port manager causing the SCSI port manager to issue a function call into the miniport driver. As a result, the function call to complete the request is in the SCSI port manager's context. The method includes calling a first routine in a first module to deliver a data packet; sending a function request to a second module that causes the second module to call a second routine in the first module. As a result, the second routine is called in the proper context.

25 Claims, 4 Drawing Sheets

U.S. PATENT DOCUMENTS

| | | | |
|---|---|---|---|
| 6,363,416 | B1 | 3/2002 | Naeimi et al. |
| 6,393,583 | B1 | 5/2002 | Meth et al. |
| 6,400,730 | B1 | 6/2002 | Latif et al. |
| 6,449,652 | B1 | 9/2002 | Blumenau et al. |
| 6,470,382 | B1 | 10/2002 | Wang et al. |
| 6,470,397 | B1 * | 10/2002 | Shah et al. .................. 709/250 |
| 6,473,803 | B1 * | 10/2002 | Stern et al. .................. 709/238 |
| 6,480,901 | B1 | 11/2002 | Weber et al. |
| 6,484,245 | B1 | 11/2002 | Sanada et al. |
| 6,591,310 | B1 * | 7/2003 | Johnson ......................... 710/3 |
| 6,640,278 | B1 | 10/2003 | Nolan et al. |
| 6,654,830 | B1 | 11/2003 | Taylor et al. |
| 6,658,459 | B1 | 12/2003 | Kwan et al. |
| 6,678,721 | B1 | 1/2004 | Bell |
| 6,683,883 | B1 | 1/2004 | Czeiger et al. |
| 6,691,244 | B1 | 2/2004 | Kampe et al. |
| 6,697,924 | B2 * | 2/2004 | Swank ........................ 711/163 |
| 6,718,361 | B1 | 4/2004 | Basani et al. |
| 6,721,907 | B2 | 4/2004 | Earl |
| 6,724,757 | B1 | 4/2004 | Zadikian et al. |
| 6,748,550 | B2 | 6/2004 | McBrearty et al. |
| 6,757,291 | B1 | 6/2004 | Hu |
| 6,763,195 | B1 | 7/2004 | Willebrand et al. |
| 6,763,419 | B2 | 7/2004 | Hoese et al. |
| 6,771,663 | B1 | 8/2004 | Jha |
| 6,771,673 | B1 | 8/2004 | Baum et al. |
| 6,807,581 | B1 * | 10/2004 | Starr et al. .................. 709/250 |
| 6,877,044 | B2 * | 4/2005 | Lo et al. ........................ 710/2 |
| 6,895,461 | B1 | 5/2005 | Thompson |
| 6,959,439 | B1 * | 10/2005 | Boike ........................ 719/326 |
| 2002/0042693 | A1 | 4/2002 | Kampe et al. |
| 2002/0049845 | A1 | 4/2002 | Sreenivasan et al. |
| 2002/0059392 | A1 | 5/2002 | Ellis |
| 2002/0065872 | A1 | 5/2002 | Genske et al. |
| 2002/0103943 | A1 | 8/2002 | Lo et al. |
| 2002/0116460 | A1 | 8/2002 | Treister et al. |
| 2002/0126680 | A1 | 9/2002 | Inagaki et al. |
| 2002/0156612 | A1 | 10/2002 | Schulter et al. |
| 2002/0188657 | A1 | 12/2002 | Traversat et al. |
| 2002/0188711 | A1 | 12/2002 | Meyer et al. |
| 2003/0018813 | A1 | 1/2003 | Antes et al. |
| 2003/0018927 | A1 | 1/2003 | Gadir et al. |
| 2003/0182455 | A1 | 9/2003 | Hetzler et al. |
| 2003/0210686 | A1 | 11/2003 | Terrell et al. |
| 2004/0064553 | A1 | 4/2004 | Kjellberg |
| 2004/0233910 | A1 | 11/2004 | Chen et al. |
| 2005/0055418 | A1 | 3/2005 | Blanc et al. |

OTHER PUBLICATIONS

Bakker, G., *IP Aliasing*, obtained from http://www.zone-h.org/files/24/ip_aliasing.txt,(1999),3 p.

Gusella, R., et al., "An Electron Algorithm for a Distributed Clock Synchronization Program", *CS Technical Report #275*, University of California, Berkeley,(Dec. 1985),pp. 1-14.

Gusella, R., et al., "The Berkeley UNIX Time Synchronization Protocol", *UNIX Programmers Manual 4.3*, vol. 2C, Berkeley Software Distrib.,,(1986), 10 p.

Knight, S., et al., *Virtual Router Redundancy Protocol*, Network Working Group, RFC 2338, obtained from http://www.search.ieft.org/rfc/rfc2338.txt,(1998),26 p.

Lewis, P., "A High-Availability Cluster for Linux", *Linux Journal*, 64, obtained from http://www2.linuxjournal.com/lj-issues/issue64/3247.html,(Apr. 1994),11 p.

Li, T., et al., *Cisco Hot Standby Router Protocol (HSRP)*, Network Working Group, RFC 2281, obtained from http://www.search.ieft.org/rfc/rfc2281.txt,(1998), 16 p.

Meth, K. Z., et al., "Design of the iSCSI protocol", *Proceedings of the 20th IEEE Conference on Mass Storage Systems and Technologies*, (Apr. 7-10, 2003), 116-122.

Moore, K., *On the Use of HTTP as a Substrate*, Network Working Group, RFC 3205, obtained from http://www.search.ieft.org/rfc/rfc3205.txt,(2002),14 p.

Satran, J., et al., *iSCSI*, IPS Internet Draft, draft-ieft-ips-iSCSI-12. txt, Category: standards—track,(Apr. 17, 2002),260 p.

Simitci, H., et al., "Evaluation of SCSP over TCP/IP and SCSI over fibre channel connections", *Hot Interconnects*, 9, (Aug. 2001),87-91.

* cited by examiner

FIG. 4

SYSTEM AND METHOD FOR INCREASED VIRTUAL DRIVER THROUGHPUT

FIELD

The present invention relates generally to virtual drivers in computer systems, and more particularly to increasing throughput of virtual drivers.

RELATED FILES

This invention is related to application Ser. No. 10/122,401, filed Apr. 11, 2002, entitled "METHOD AND APPARATUS FOR SUPPORTING COMMUNICATIONS BETWEEN NODES OPERATING IN A MASTER-SLAVE CONFIGURATION", which is a continuation of application Ser. No. 09/949,182, filed Sep. 7, 2001, entitled "METHOD AND APPARATUS FOR SUPPORTING COMMUNICATIONS BETWEEN NODES OPERATING IN A MASTER-SLAVE CONFIGURATION"; application Ser. No. 10/094,552, filed Mar. 7, 2002, entitled "METHOD AND APPARATUS FOR EXCHANGING HEARTBEAT MESSAGES AND CONFIGURATION INFORMATION BETWEEN NODES OPERATING IN A MASTER-SLAVE CONFIGURATION"; application Ser. No. 10/131,275, filed Apr. 22, 2002, entitled "METHOD AND APPARATUS FOR CONFIGURING NODES AS MASTERS OR SLAVES"; application Ser. No. 10/131,274, filed Apr. 22, 2002, entitled "METHOD AND APPARATUS FOR TERMINATING APPLICATIONS IN A HIGH-AVAILABILITY NETWORK", application Ser. No. 10/128,656, filed Apr. 22, 2002, now U.S. Pat. No. 7,165,258, issued on Jan. 16, 2007, entitled "SCSI-BASED STORAGE AREA NETWORK HAVING A SCSI ROUTER THAT ROUTES TRAFFIC BETWEEN SCSI AND IP NETWORKS"; application Ser. No. 10/131,793, filed Apr. 22, 2002, entitled "VIRTUAL SCSI BUS FOR SCSI-BASED STORAGE AREA NETWORK"; application Ser. No. 10/131,782, filed Apr. 22, 2002, entitled "VIRTUAL MAC ADDRESS SYSTEM AND METHOD"; application Ser. No. 10/128,655, filed Apr. 22, 2002, entitled "SYSTEM AND METHOD FOR CONFIGURING FIBRE-CHANNEL DEVICES"; application Ser. No. 10/131,789, filed Apr. 22, 2002, entitled "METHOD AND APPARATUS FOR ASSOCIATING AN IP ADDRESS AND INTERFACE TO A SCSI ROUTING INSTANCE"; application Ser. No. 10/128,657, filed Apr. 22, 2002, entitled "METHOD AND APPARATUS FOR EXCHANGING CONFIGURATION INFORMATION BETWEEN NODES OPERATING IN A MASTER-SLAVE CONFIGURATION"; application Ser. No. 10/128,993, filed Apr. 22, 2002, entitled "SESSION-BASED TARGET/LUN MAPPING FOR A STORAGE AREA NETWORK AND ASSOCIATED METHOD"; application Ser. No. 10/143,561, filed even date herewith, entitled "SYSTEM, METHOD, AND SOFTWARE FOR TARGET ID BUILDING IN A STORAGE-AREA NETWORK"; application Ser. No. 10/143,560, filed even date herewith, entitled "SYSTEM AND METHOD FOR DELAYED ERROR HANDLING"; application Ser. No. 10/143,493, filed even date herewith, entitled "LATENCY REDUCTION IN NETWORK DATA TRANSFER OPERATIONS"; and application Ser. No. 10/143,456, filed even date herewith, entitled "SYSTEM, METHOD, AND SOFTWARE FOR A VIRTUAL HOST BUS ADAPTER IN A STORAGE-AREA NETWORK"; all of the above of which are hereby incorporated by reference.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright©2002, Cisco Systems, Inc. All Rights Reserved.

BACKGROUND

The use of computer networks, including the Internet, continues to grow at a rapid pace. This growth includes growth in the number of devices on networks, the types of devices on networks, and the protocols used on networks. One aspect of this growth is the encapsulation of a first protocol in a second protocol. An example of this is the iSCSI protocol (Internet SCSI). iSCSI is an Internet Protocol (IP)-based storage networking standard for linking data storage facilities, developed by the Internet Engineering Task Force (IETF). By carrying SCSI commands over IP networks, iSCSI is used to facilitate data transfers over intranets and to manage storage over long distances. Because of the ubiquity of IP networks, iSCSI can be used to transmit data over local area networks (LANs), wide area networks (WANs), or the Internet and can enable location-independent data storage and retrieval.

While iSCSI has many advantages, previous systems implementing the iSCSI protocol have suffered from problems with I/O (input/output) throughput. A potential cause of this problem results from the fact that iSCSI is typically implemented using a virtual device driver. Conventional SCSI interfaces required a hardware adapter to interface with a SCSI device. In such conventional SCSI implementations, the SCSI host bus adapter (HBA) can signal I/O using a hardware interrupt to a physical device driver (physical because a physical HBA is present). As a result, software that uses SCSI can be notified almost immediately that data has been sent or is available.

Unlike conventional SCSI, iSCSI implementations do not interface with a physical SCSI HBA, rather they interface with a network stack in order to communicate with SCSI devices that reside on an IP network. Because no physical SCSI device is present, there are no interrupts to indicate that data has been sent, or is available. As a result, iSCSI implementations in previous systems have typically relied on a timer expiration to cause a virtual device (virtual because there is no physical SCSI device) driver to be polled to see if data is available. In some instances, the resolution of the timer is ten milliseconds, resulting in relatively large polling intervals. When there are many connections between iSCSI hosts and iSCSI targets, such polling is acceptable. However, when there are relatively few connections, the latency in processing serial commands for a connection caused by the polling can be unacceptably large.

As a result, there is a need in the art for the present invention.

SUMMARY

The above-mentioned shortcomings, disadvantages and problems are addressed by the present invention, which will be understood by reading and studying the following specification. One aspect of the present invention is computerized system for providing data input and output. In one embodiment the system includes a SCSI (Small Computer System Interconnect) port manager; a miniport driver operatively coupled to the SCSI port manager; and a network interface operatively coupled to the miniport driver. Upon receiving indication that a SCSI command has been completed, the miniport driver issues a request to the SCSI port manager causing the SCSI port manager to issue a function call into the miniport driver. As a result, the function call to complete the request is in the SCSI port manager's context.

In one embodiment of the invention, the miniport driver schedules a worker thread to issue the request to the SCSI port manager.

A further aspect of the present invention is a method for processing a request in a virtual driver. In one embodiment the method includes calling a first routine in a first module to deliver a data packet; sending a function request to a second module that causes the second module to call a second routine in the first module. As a result, the second routine is called in the proper context.

As can be seen from the above, the systems and methods of the present invention have the advantage that they can eliminate, or at least reduce the use of timers and the associated latency that comes with the use of timers.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the present invention.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component which appears in multiple Figures. Signals and connections may be referred to by the same reference number or label, and the actual meaning will be clear from its use in the context of the description.

The following detailed description is, therefore, not to be taken in a limiting sense, and the scope of the present invention is defined only by the appended claims.

Operating Environment

Figure 1:
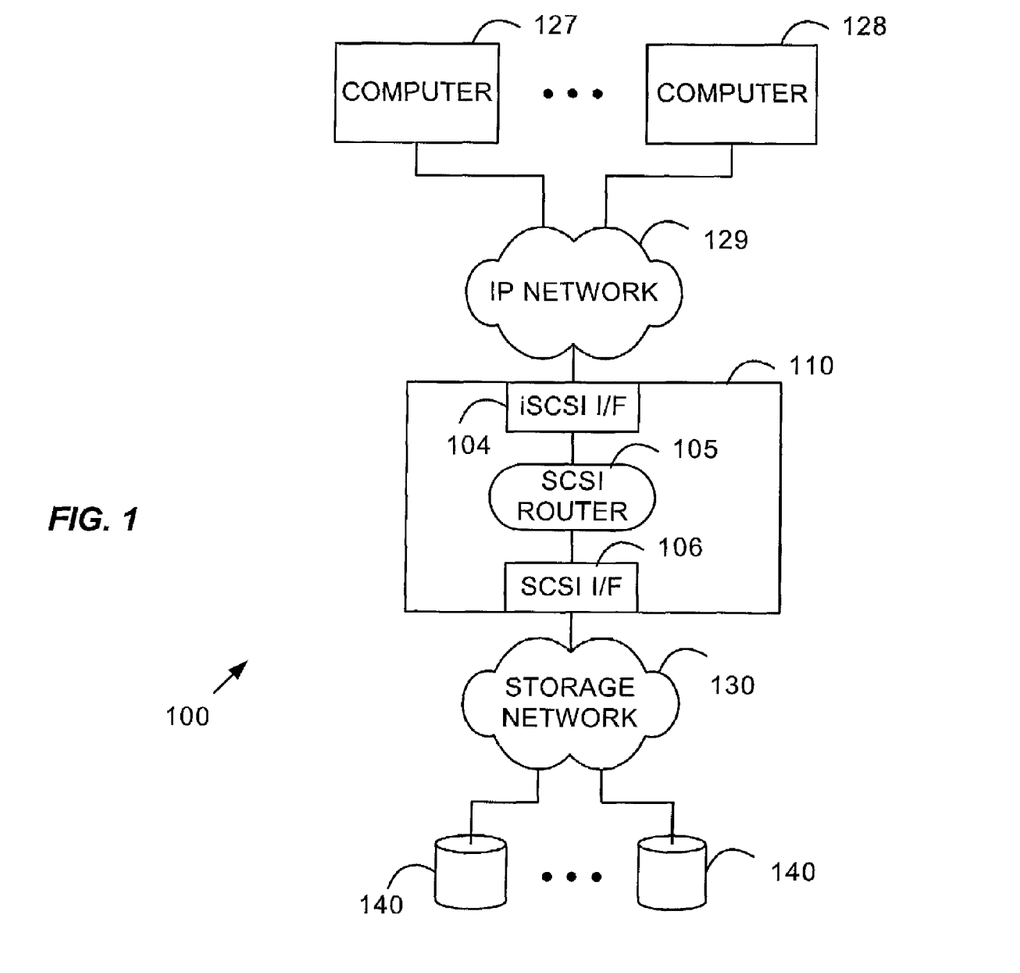
FIG. 1 is a block diagram of a storage router hardware and operating environment in which different embodiments of the invention can be practiced.

Some embodiments of the invention operate in an environment of systems and methods that provide a means for fibre-channel bases SANs to be accessed from TCP/IP network hosts. FIG. 1 is a block diagram describing the major components of such a system. Storage router system 100 includes computers (127, 128) connected through an IP network 129 to storage router 110. Storage router 110 is connected in turn through storage network 130 to one or more SCSI devices 140. In the embodiment shown in FIG. 3, storage router 110 includes an iSCSI (Internet SCSI) interface 104, a SCSI router 105 and a SCSI interface 106. iSCSI interface 104 receives encapsulated SCSI packets from IP network 129, extracts the SCSI packet and send the SCSI packet to SCSI router 105. SCSI interface 106 modifies the SCSI packet to conform with its network protocol (e.g., Fibre Channel, parallel SCSI, or iSCSI) and places the modified SCSI packet onto storage network 130. The SCSI packet is then delivered to its designated SCSI device 140.

In one embodiment, storage router 110 provides IPv4 router functionality between a single Gigabit Ethernet and a Fibre Channel interface. In one such embodiment, static routes are supported. In addition, storage router 110 supports a configurable MTU size for each interface, and has the ability to reassemble and refragment IP packets based on the MTU of the destination interface.

In one embodiment, storage router 110 acts as a gateway, converting SCSI protocol between Fibre Channel and TCP/IP. Storage router 110 is configured in such an embodiment to present Fibre Channel devices as iSCSI targets, providing the ability for clients on the IP network to directly access storage devices.

In one embodiment, SCSI routing occurs in the Storage Router 110 through the mapping of physical storage devices to iSCSI targets. An iSCSI target (also called logical target) is an arbitrary name for a group of physical storage devices. You can map an iSCSI target to multiple physical devices. An iSCSI target always contains at least one Logical Unit Number (LUN). Each LUN on an iSCSI target is mapped to a single LUN on a physical storage target.

Further details on the operation of the above can be found in U.S. patent application Ser. No. 10/131,793 entitled ""VIRTUAL SCSI BUS FOR SCSI-BASED STORAGE AREA NETWORK" which has been previously incorporated by reference.

Figure 2:
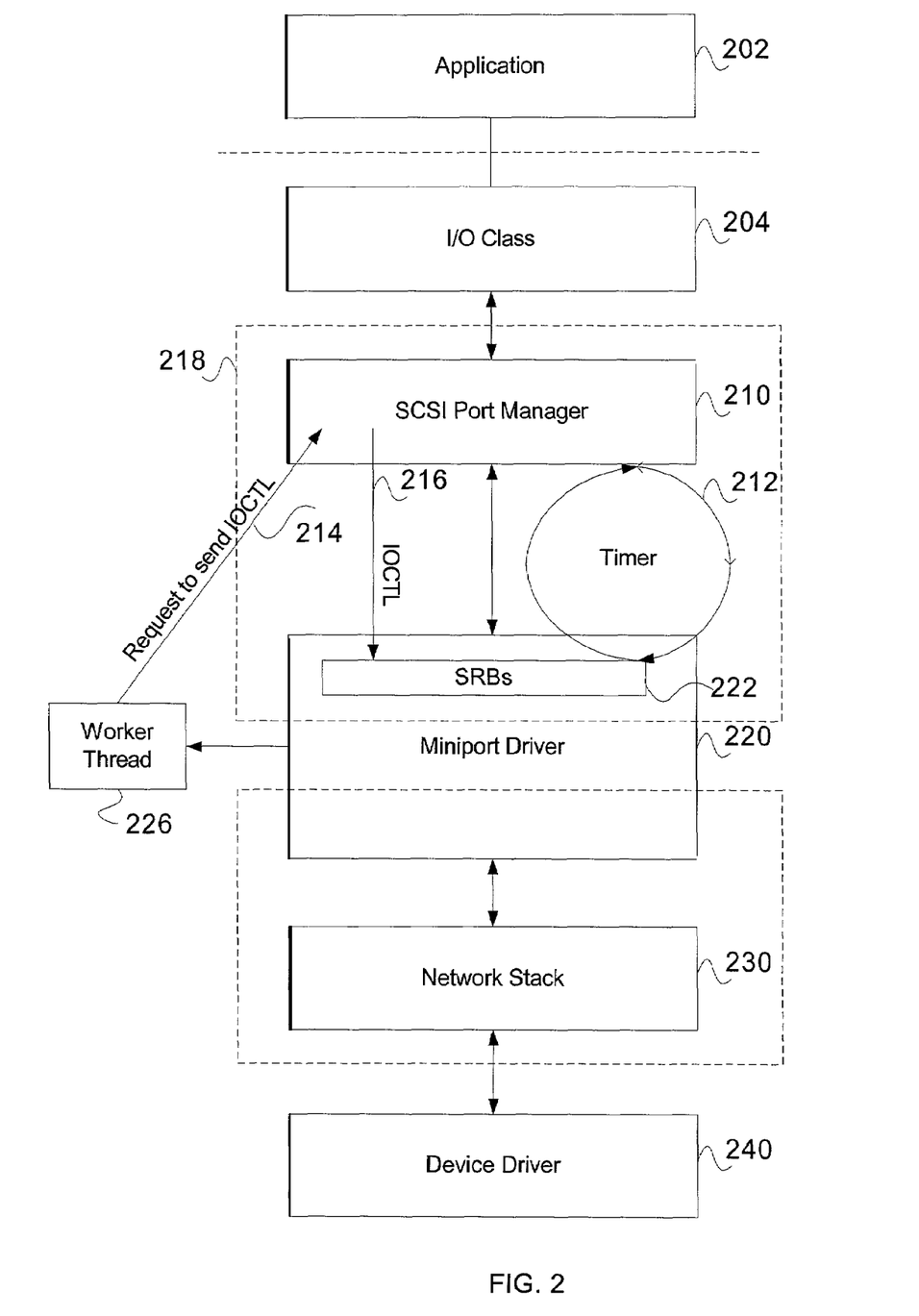
FIG. 2 is a diagram providing further details of a host computer environment according to an embodiment of the invention.

FIG. 2 provides further details of a software environment for host computers such as computer 127 and 128 in which embodiments of the invention operate. In some embodiments, the software environment includes application 202, I/O (Input/Output) class 204, SCSI port manager 210, miniport driver 220, network stack 230, and device driver 240. Application 202 represents any type of software application that requires I/O services from an operating system. In some embodiments of the invention, the operating system is a variant of the Microsoft Windows operating system from Microsoft Corporation.

In some embodiments, I/O class 204 comprises one or more modules that provide input and output services to applications 202. In some embodiments, these modules include file system management modules, volume management modules, and file system drivers. Typically, such modules provide block I/O services to applications 202.

In some embodiments, SCSI port manager 210 supplies the interface to one or more miniport drivers 220. SCSI port manager 210 may orchestrate the loading and initialization of miniport drivers 220, export a number of services available to miniport device drivers, and coordinate input and output between modules in I/O class 204 and the miniport driver 220. Typically, SCSI port manager provides services in a device independent manner, while miniport driver 220 implements functions that are device specific. For example, prior art miniport drivers 220 typically interfaced with a particular SCSI hardware interface, or interfaced with a device driver module that was specific to a particular SCSI hardware interface.

In some embodiments of the invention, miniport driver 220 communicates with a network stack 230. In these embodiments, the miniport driver can also be referred to as a virtual driver because it does not directly interface with a physical device such as a SCSI adapter. In one embodiment, miniport driver 220 uses network stack 230 to send data that conforms to the iSCSI protocol over a TCP/IP network to a storage router. The network stack operates to encapsulate iSCSI data with the appropriate TCP/IP headers, and physical network headers (e.g. Ethernet headers).

As can be seen from the foregoing description, the miniport driver exposes interfaces to both the SCSI port manager 210 and the network stack 230. In some embodiments of the invention, modules such as drivers, processes and threads have a context associated with them. A context typically defines aspects of the module, such as priority level, access rights, security rights, memory access etc. Thus, in some embodiments, network stack 230 has an associated context 232, and SCSI port manager 210 has a associated context 218. Thus, when the network stack interfaces with the miniport driver, the calls into the miniport driver are made in the network stack's context 232. Similarly, when the SCSI port manager issues interface calls into the miniport driver, the calls are made in the SCSI port manager's context 218.

The operation of the above-described system can be illustrated using the following example. Assume that application 202 desires to read and write data to a disk. Further assume that the desired disk is attached to a device implementing the iSCSI protocol (e.g. a storage router). Upon initiating a read or write request to I/O class 204, the request is passed to the SCSI port manage 210, which formats the request into a data packet conforming to the SCSI protocol. This includes encapsulating the request in a SCSI request block (SRB). SCSI port manager 210 then calls into the appropriate miniport driver passing the SRB, in this example, the miniport driver that communicates over a network to an iSCSI device. The miniport driver is then responsible for the SRB for each request received. The miniport driver then calls the network stack to transport the packets over the network to a target.

Per the iSCSI protocol, as requests are completed by a target, an acknowledgement is provided to the initiator indicating the request is complete. The network stack 230 delivers the acknowledgement to the miniport driver 220, which places the SRB on a list of SRBs 222 that can be completed. In some embodiments, upon receiving an indication that an SRB can be completed, miniport driver 220 schedules a worker thread 226. In these embodiments, worker thread 226 sends a request 214 to the SCSI port manager 210 to issue a function call to the miniport driver 220. The function call 214 into the SCSI port manager causes the port manager to issue its own function call 216 into the miniport driver 220. In some embodiments, the function call is an "ioctl" function call. In essence, the miniport driver is causing a ioctl to be sent to itself. However, because the SCSI port manager issues the function call, the context of the function is the SCSI port manager context 210. This provides the correct context for the further processing of the completed SRBs to upper layers such as the I/O class 204 and application 202. This is desirable in order to cause the processing of the completed SRBS to be done at the right IRQL (Interrupt Request Level). In these embodiments, worker thread 226 causes the specified function to be called within a system thread at the lowest (passive) IRQL, rather than at the miniport driver's higher IRQL.

Timer 212 is a timer routine that goes off at predetermined intervals. In some embodiments of the invention, timer 212 goes off at 10 millisecond intervals. In prior art systems, timer 212 is used to cause the SCSI port manager 210 to call into miniport driver 220 to cause completed SCSI request blocks 222 to be processed. In some embodiments, timer 212 is used in addition to the function calls described above. The timer can be useful for two reasons. First, the timer may cause an SRB that can be completed to be processed and complete the queued requests sooner then using the two function calls (request to send ioctl, and the ioctl). Second, the timer routine may be necessary to further process completed requests which are processed by the worker thread. This further processing may include moving the request to a completed queue.

In some embodiments, either upon receiving the function call (i.e. the ioctl call), or upon being called due to timer 212 expiration, the miniport driver will cause the SRBs 222 that can be completed to be processed. In some embodiments, this processing includes calling a function "ScsiPortNotification" with a "RequestComplete" flag set for each SRB in completed SRBs 222.

Figure 3:
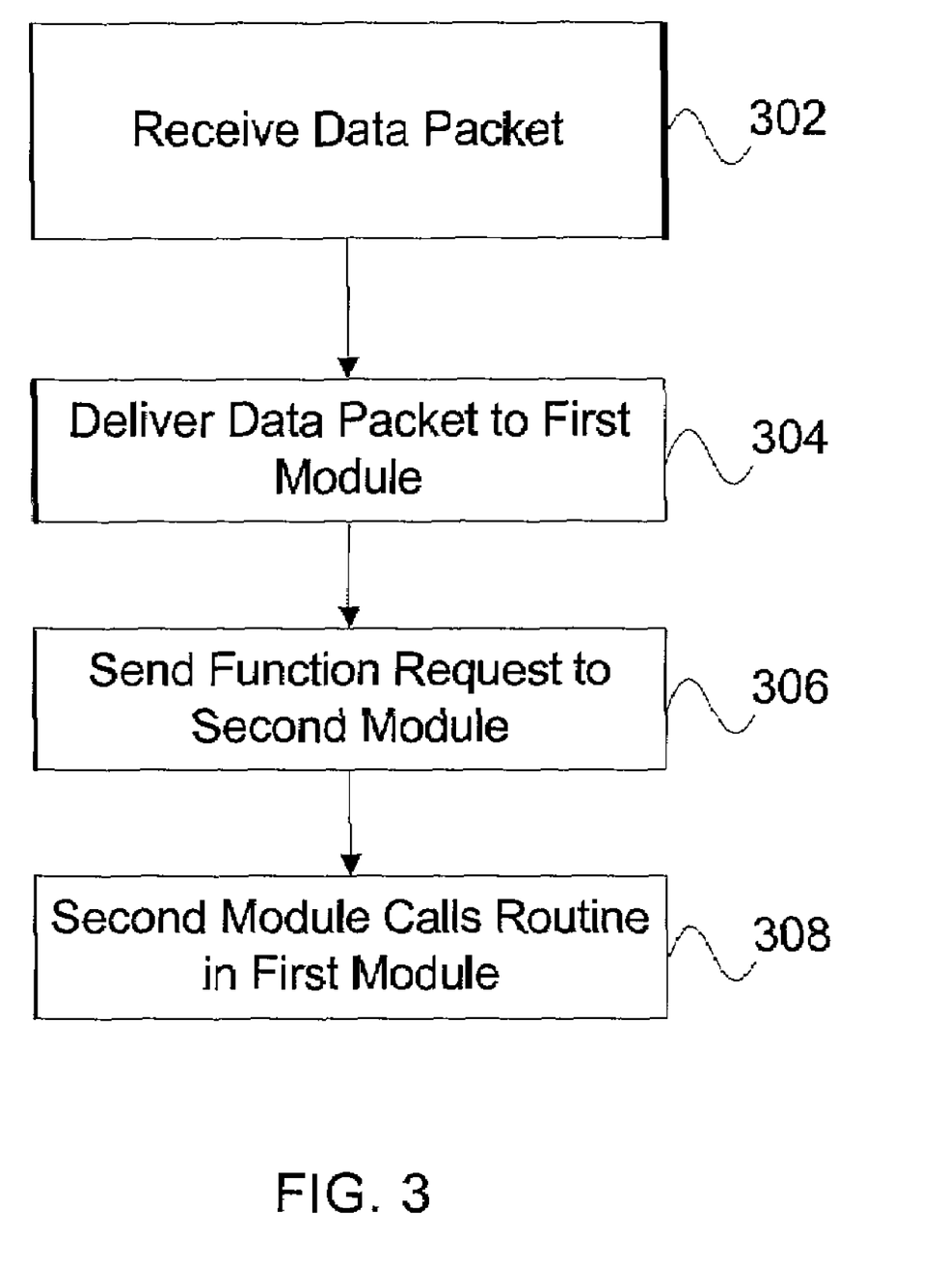
FIG. 3 is a flowchart illustrating a method for providing increased virtual driver throughput according to an embodiment of the invention.

FIG. 3 is a flowchart illustrating a method for providing increased virtual driver throughput according to an embodiment of the invention. The method to be performed by the operating environment constitute computer programs made up of computer-executable instructions. Describing the methods by reference to a flowchart enables one skilled in the art to develop such programs including such instructions to carry out the methods on suitable computers (the processor of the computer executing the instructions from computer-readable media). The method illustrated in FIG. 3 is inclusive of the acts required to be taken by an operating environment executing an exemplary embodiment of the invention.

The method begins by receiving a data packet (block 302). In some embodiments of the invention, the data packet is an iSCSI packet comprising an indication that an request has been completed.

Next, a system executing the method calls a function in a first module to deliver the packet (block 304). In some embodiments of the invention, the first module is a miniport driver and a network stack module calls a routine within the miniport driver to deliver the packet. In further embodiments, the call takes place in the context of the network stack.

Upon receiving the data packet, a function request is sent to a second module (block 306). In some embodiments of the invention, the second module is a SCSI port manager. Further, in some embodiments the function request is a request sent to the SCSI port manager to cause the SCSI port manager to issue an "ioctl" function to the miniport driver. In alternative embodiments of the invention, the miniport driver schedules a worker thread that sends the function request to the SCSI port manager.

Finally, the second module calls a second routine in the first module (block 308). In some embodiments, the second module issues an "ioctl" call to the first module. In alternative embodiments of the invention, the first module is a miniport driver and the second module is a SCSI port manager.

Upon receiving the ioctl call, the first module, in some embodiments of the invention, the first module causes further processing to take place on a request associated with the data packet. In some embodiments, the further processing includes processing associated with completing a request. The further processing takes place in the context of the second module.

Figure 4:
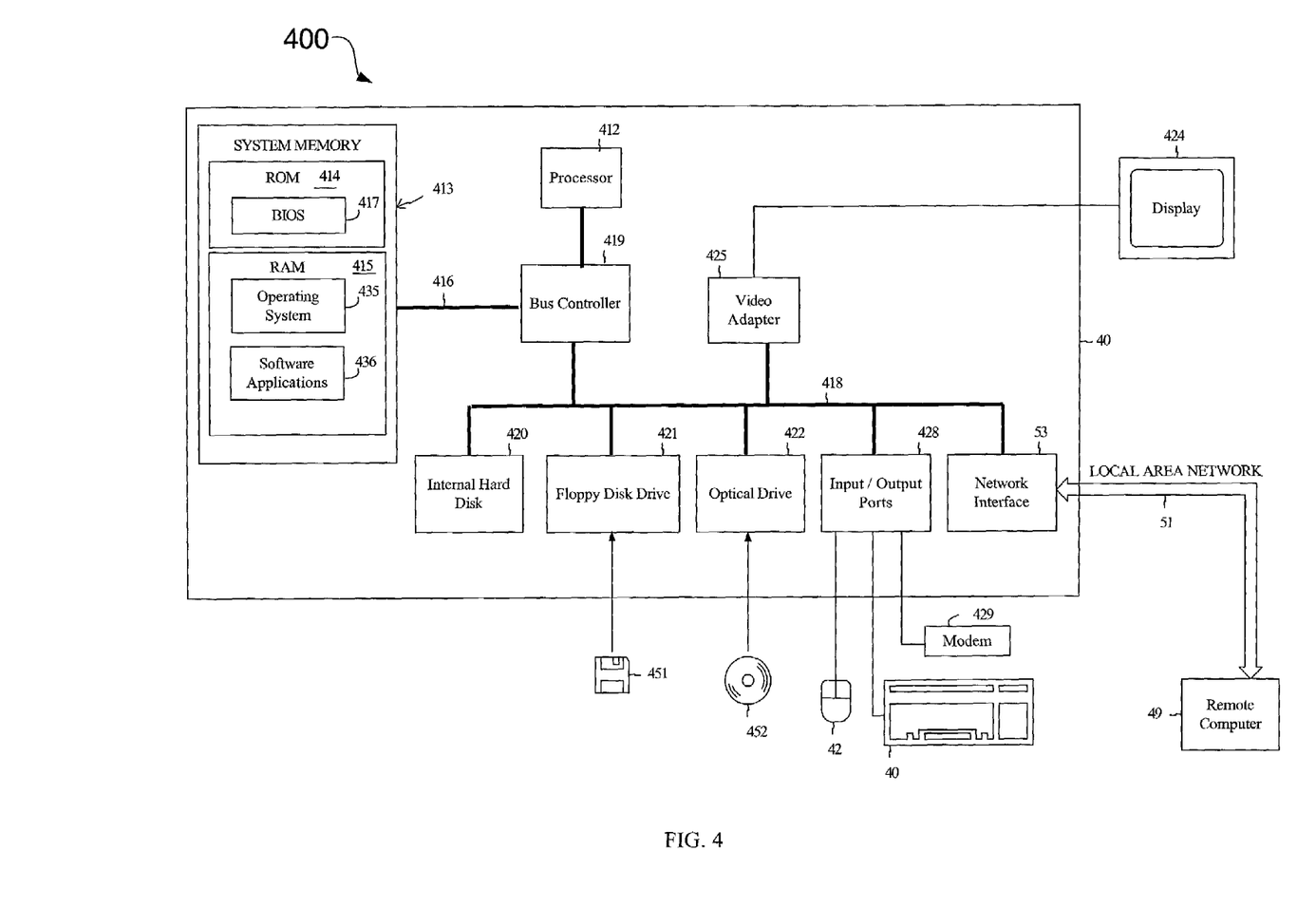
FIG. 4 is a diagram illustrating the major hardware components of a computer incorporating embodiments of the invention.

FIG. 4 is a diagram of the hardware and operating environment in conjunction with which embodiments of the invention may be practiced. The description of FIG. 3 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer or a server computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

As shown in FIG. 4, the computing system 400 includes a processor. The invention can be implemented on computers based upon microprocessors such as the PENTIUM® family of microprocessors manufactured by the Intel Corporation, the MIPS® family of microprocessors from the Silicon Graphics Corporation, the POWERPC® family of microprocessors from both the Motorola Corporation and the IBM Corporation, the PRECISION ARCHITECTURE® family of microprocessors from the Hewlett-Packard Company, the SPARC® family of microprocessors from the Sun Microsystems Corporation, or the ALPHA® family of microprocessors from the Compaq Computer Corporation. Computing system 400 represents any personal computer, laptop, server, or even a battery-powered, pocket-sized, mobile computer known as a hand-held PC.

The computing system 400 includes system memory 413 (including read-only memory (ROM) 414 and random access memory (RAM) 415), which is connected to the processor 412 by a system data/address bus 416. ROM 414 represents any device that is primarily read-only including electrically erasable programmable read-only memory (EEPROM), flash memory, etc. RAM 415 represents any random access memory such as Synchronous Dynamic Random Access Memory.

Within the computing system 400, input/output bus 418 is connected to the data/address bus 416 via bus controller 419. In one embodiment, input/output bus 418 is implemented as a standard Peripheral Component Interconnect (PCI) bus. The bus controller 419 examines all signals from the processor 412 to route the signals to the appropriate bus. Signals between the processor 412 and the system memory 413 are merely passed through the bus controller 419. However, signals from the processor 412 intended for devices other than system memory 413 are routed onto the input/output bus 418.

Various devices are connected to the input/output bus 418 including hard disk drive 420, floppy drive 421 that is used to read floppy disk 451, and optical drive 422, such as a CD-ROM drive that is used to read an optical disk 452. The video display 424 or other kind of display device is connected to the input/output bus 418 via a video adapter 425.

A user enters commands and information into the computing system 400 by using a keyboard 40 and/or pointing device, such as a mouse 42, which are connected to bus 418 via input/output ports 428. Other types of pointing devices (not shown in FIG. 4) include track pads, track balls, joy sticks, data gloves, head trackers, and other devices suitable for positioning a cursor on the video display 424.

As shown in FIG. 4, the computing system 400 also includes a modem 429. Although illustrated in FIG. 4 as external to the computing system 400, those of ordinary skill in the art will quickly recognize that the modem 429 may also be internal to the computing system 400. The modem 429 is typically used to communicate over wide area networks (not shown), such as the global Internet. The computing system may also contain a network interface card 53, as is known in the art, for communication over a network.

Software applications 436 and data are typically stored via one of the memory storage devices, which may include the hard disk 420, floppy disk 451, CD-ROM 452 and are copied to RAM 415 for execution. In one embodiment, however, software applications 436 are stored in ROM 414 and are copied to RAM 415 for execution or are executed directly from ROM 414.

In general, the operating system 435 executes software applications 436 and carries out instructions issued by the user. For example, when the user wants to load a software application 436, the operating system 435 interprets the instruction and causes the processor 412 to load software application 436 into RAM 415 from either the hard disk 420 or the optical disk 452. Once software application 436 is loaded into the RAM 415, it can be used by the processor 412. In case of large software applications 436, processor 412 loads various portions of program modules into RAM 415 as needed.

The Basic Input/Output System (BIOS) 417 for the computing system 400 is stored in ROM 414 and is loaded into RAM 415 upon booting. Those skilled in the art will recognize that the BIOS 417 is a set of basic executable routines that have conventionally helped to transfer information between the computing resources within the computing system 400. These low-level service routines are used by operating system 435 or other software applications 436.

In one embodiment computing system 400 includes a registry (not shown) which is a system database that holds configuration information for computing system 400. For example, Windows® 95, Windows 98®, Windows® NT, Windows 2000® and Windows XP® by Microsoft maintain the registry in two hidden files, called USER.DAT and SYSTEM.DAT, located on a permanent storage device such as an internal disk.

CONCLUSION

Systems and methods for improving I/O throughput using ioctl function calls are disclosed. The systems and methods described provide advantages over previous systems. For example, the I/O throughput of systems incorporating embodiments of the invention can be improved because data is processed as it is received, rather than waiting for a timer with a ten-millisecond granularity to expire. In one particular embodiment, I/O throughput was increased by a factor of 3-4 times over using the timer alone.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

The terminology used in this application is meant to include all of these environments. It is to be understood that the above description is intended to be illustrative, and not restrictive. Many other embodiments will be apparent to those of skill in the art upon reviewing the above description. Therefore, it is manifestly intended that this invention be limited only by the following claims and equivalents thereof.

I claim:

1. A computerized system for providing data input and output, the system comprising:
   a processor and a memory;
   a SCSI (Small Computer System Interconnect) port manager, the SCSI port manager executable by the processor from the memory and having a module context;
   a miniport driver operatively coupled to the SCSI port manager; the miniport driver having a miniport driver context; and
   a network interface operatively coupled to the miniport driver;
   wherein the miniport driver is operable to cause a worker thread to issue a request to the SCSI port manager, the request causing the SCSI port manager to issue a function call back into the miniport driver, said function call having the module context of the SCSI port manager and wherein the module context is a lower priority context than the miniport driver context, and further wherein the miniport driver is operable to complete a SCSI request block in response to receiving the function call.

2. The system of claim 1, wherein the network interface is an Ethernet interface.

3. The system of claim 2, wherein the Ethernet interface is a Gigabit Ethernet interface.

4. A data-processing system, comprising:
   a processor;
   a memory;
   a worker thread executable by the processor; and
   data-processing software that is operable on the data-processing system to:
      call a first routine in a first module to deliver a data packet; and
      causing the worker thread to send a function request to a SCSI port manager, wherein the function request causes the SCSI port manager to call a second routine in the first module;
      wherein calling the first routine occurs in a network stack context and calling the second routine occurs in a SCSI port manager context and wherein the SCSI port manager context is a lower priority context than the network stack context.

5. The data processing system of claim 4, wherein the first module is a miniport driver.

6. The data processing system of claim 4, wherein the function request is a request for an "ioctl" function.

7. The data processing system of claim 4, wherein the second routine is an "ioctl" function.

8. The data processing system of claim 4, wherein the data packet is an iSCSI (Internet SCSI) data packet.

9. A method for processing a request in a miniport driver, the method comprising:
   calling a first routine in a first module to deliver a data packet; and
   causing a worker thread to send a function request to a SCSI module, wherein the function request causes the SCSI module to call a second routine in the first module;
   wherein calling the first routine occurs in a network stack context and calling the second routine occurs in a SCSI module context and wherein the SCSI module context is a lower priority context than the network stack context.

10. The method of claim 9, wherein the first module is a miniport driver.

11. The method of claim 9, wherein the SCSI module is a SCSI port manager module.

12. The method of claim 9, wherein the function request is a request for an "ioctl" function.

13. The method of claim 9, wherein the second routine is an "ioctl" function.

14. The method of claim 9, wherein the SCSI module context is a SCSI port manager context.

15. The method of claim 9, wherein the data packet is an iSCSI (Internet SCSI) data packet.

16. A computer-readable storage medium having stored thereon computer executable instructions for performing a method for processing a request in a miniport driver, the method comprising:
   calling a first routine in a first module to deliver a data packet; and
   causing a worker thread to send a function request to a SCSI module, wherein the function request causes the SCSI module to call a second routine in the first module;
   wherein calling the first routine occurs in a network stack context and calling the second routine occurs in a SCSI module context and wherein the SCSI module context is a lower priority context than the network stack context.

17. The computer-readable medium of claim 16, wherein the first module is a miniport driver.

18. The computer-readable medium of claim 16, wherein the SCSI module is a SCSI port manager module.

19. The computer-readable medium of claim 16, wherein the function request is a request for an "ioctl" function.

20. The computer-readable medium of claim 16, wherein the second routine is an "ioctl" function.

21. The computer-readable medium of claim 16, wherein the SCSI module context is a SCSI port manager context.

22. The computer-readable medium of claim 16, wherein the data packet is an iSCSI (Internet SCSI) data packet.

23. A system for providing SCSI data input and output comprising:

a processor and a memory means for calling a first routine in a first module executable by the process from the memory and operable to deliver a data packet; and means for causing a worker thread to send a function request to a SCSI module, wherein the function request causes the SCSI module to call a second routine in the first module;

wherein calling the first routine occurs in a network stack context and calling the second routine occurs in a SCSI module context and wherein the SCSI module context is a lower priority context than the network stack context.

24. The system of claim 23, wherein the first module is a miniport driver.

25. The system of claim 23, wherein the SCSI module is a SCSI port manager module.

* * * * *

UNITED STATES PATENT AND TRADEMARK OFFICE
CERTIFICATE OF CORRECTION

PATENT NO. : 7,509,436 B1
APPLICATION NO. : 10/143503
DATED : March 24, 2009
INVENTOR(S) : Rissmeyer It is certified that error appears in the above-identified patent and that said Letters Patent is hereby corrected as shown below:

On the Title Page
On Page 2, under "Other Publications", Item (56), line 3, delete "Electron" and insert -- Election --, therefor.

Signed and Sealed this

Second Day of June, 2009

JOHN DOLL
*Acting Director of the United States Patent and Trademark Office*